Aug. 3, 1943.   C. T. WALTER   2,326,082

MARKING SAUSAGE

Filed May 31, 1940

ATTEST-

Charles T. Walter
INVENTOR

BY
ATTORNEY

Patented Aug. 3, 1943

2,326,082

UNITED STATES PATENT OFFICE 2,326,082

MARKING SAUSAGE

Charles T. Walter, Chicago, Ill., assignor to Industrial Patents Corporation, Chicago, Ill., a corporation of Delaware Application May 31, 1940, Serial No. 338,284

4 Claims. (Cl. 17—45)

This invention relates to the manufacture of encased meats such as sausage, and particularly the marking thereof.

One of the objects of this invention is to provide an improved method for identification of sausage stuffed in casings prepared from animal intestines.

Another object of the invention is to provide a sausage with an improved means of identification.

Another object of the invention is to provide an improved method for inserting marking strips into unprinted casings during stuffing thereof.

Other objects of the invention will be apparent from the description and claims which follow.

My present invention relates to an improvement in the marking of natural casings with a means of identification. Natural casings are more porous than artificial casings, and the porosity permits the sausage product to more readily absorb the curing and flavoring components of the treating atmosphere. However, natural casings are not easily printed so that brands or other identifying marks do not remain thereon. By means of my present invention I am able to retain the superior flavor resulting from the use of natural casings, and also to readily and easily identify the product contained therein.

It has previously been suggested that sausage encased in natural casings could be identified by the insertion of a branding strip within the casing and adjacent thereto, as for example, the patents to Freeman, Nos. 2,169,412 and 2,169,413, both issued August 15, 1939. In actual practice on a commercial basis such inventions were not practical. The use of such marking strips was readily apparent through the casing, which detracted from the appearance of the finished product. The appearance of the sausage was marred by the failure of the branding strip to bind to the sausage, thereby permitting the formation of air pockets or "blisters." This failure of the branding ribbon to bind to the casing also resulted in shrinking or wrinkling of the sausage. Further, it was difficult to secure a material smooth enough to be satisfactorily printed and strong enough when dampened to withstand handling during the stuffing operation. The greatest objection to the prior suggestion has been that the branding strip tended to become separated from the casing and buried in the sausage meat. It, therefore, became invisible from the outside and useless as a means of identification, in addition to being objectionable to consumers in that the printed strip was in the body of the sausage during eating.

My invention relates to a method of branding sausage products by means of a pre-printed branding ribbon inserted within the casing at the time of stuffing. By the combination of factors hereinafter mentioned, I am able to avoid the defects of the prior art. By using the particular type of stuffing horn mentioned, and the particular branding ribbons disclosed, the branding strip is forced against the casing so that it can not be buried in the sausage, the ribbon is not visible as such in the finished product, and has been so bonded to the casing that blisters and wrinkles do not result from its use. The finished product appears to bear printing on the casing, but is much cheaper to prepare than the pre-printed natural casings.

The invention will be readily understood by reference to the drawing in which similar reference characters indicate similar parts of the several figures.

In the preferred embodiment of my invention I insert a ribbon 1 prepared from animal casing and printed with suitable identification marks into the casing so that the marks are visible through the wall of the casing. I am able to insert the ribbon 1 inside the casing without the objectionable results of the previous art by the method herein described. The ribbon is prepared from a natural casing, such as beef weasands which are ideal for the purpose of this invention because they are relatively large, are relatively strong and thin, and are readily printed as described in my prior Patents No. 2,119,729, issued June 7, 1938, and No. 2,054,148, issued September 15, 1936. Other animal membranes, such as beef middles, or any animal intestines, such as hog intestines, can be used in place of beef weasands, although I prefer weasands because of their lower ultimate cost. The casing is dried and then slit lengthwise so as to form a sheet, and the sheet is then printed. The indicia of identification 2 are preferably printed in rows or columns 3. I prefer to cut the printed sheet between the rows or columns, such as along the lines 4, thereby forming the ribbon 1 which contains thereon the printed indicia 2, and which is substantially the length of the casing to be stuffed.

Figure 1:
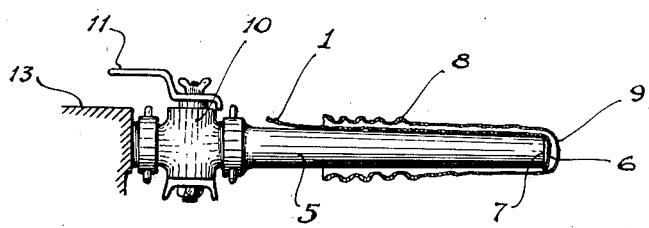
Figure 1 is a side view of a stuffing horn showing the identification strip and casing in place for stuffing.
Figure 2:
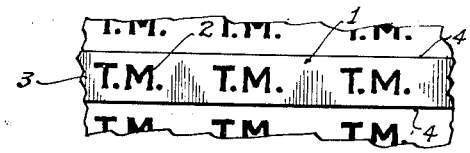
Figure 2 is a plan view of a ribbon of animal intestine containing identification marks printed thereon.
Figure 3:
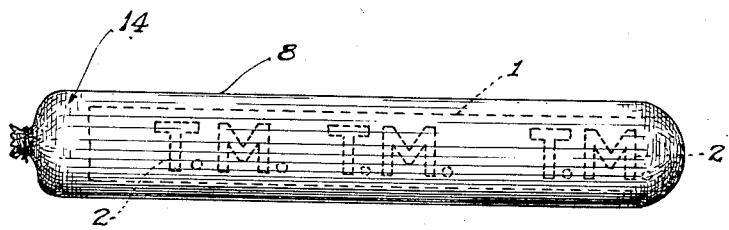
Figure 3 is a side view of a sausage showing the identification strip in place.
Figure 4:
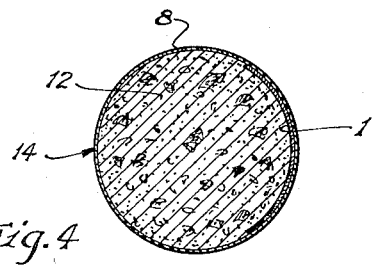
Figure 4 is a cross-sectional view of a sausage such as is shown in Figure 3.

The printed ribbon 1 is very lightly moistened and laid on a sausage stuffing horn or nozzle 5. Care should be taken to prevent the identifying ribbon from becoming wet, as wet animal casings are very soft and pliable, so that the ribbon would be stretched out of shape and the printing would not be regular in appearance. The ribbon must be slightly damp so as to adhere to the casing. Care should also be taken to be certain that the end 6 of the identification ribbon extends across the mouth 7 of the horn 5, the remainder of the ribbon being laid along the top of the horn. The stuffing horn 5 is similar in construction to those ordinarily used in sausage plants, except that it is much larger in diameter. In the process of my invention it is very important that the stuffing horn be substantially as large as the casing which is to be stuffed with sausage meat. This enables substantially the entire internal surface of the casing to be directly exposed to the external surface of the stuffing horn, except that portion of the internal surface of said casing which overlies or is in the zone of the moistened strip, as will be apparent from Figure 1. The use of the ordinary stuffing horn is unsatisfactory as it permits the identification ribbon to become buried in the sausage meat, thereby failing to identify the sausage as desired, and also being objectionable to the consumer. The casing 8 is threaded on the horn in the usual manner so that the closed end 9 is substantially against the mouth 7 of the stuffing horn. The casing is then stuffed in the usual manner by opening the stuffer nozzle valve 10, as by means of a lever 11, thereby permitting the sausage meat 12 contained in the stuffing cylinder 13 to flow through the horn 5 into the casing 8. The sausage meat 12 moving through the horn forces the identification ribbon 1 firmly against the casing 8, and at the same time forces the stuffed sausage off the horn 5.

The sausage 14, which comprises the casing 8 stuffed with meat 12 and containing the identification ribbon 1 adjacent to the casing and visible therethrough, is then cured and dried or smoked in the ordinary manner.

The use of the large stuffing horn prevents the identifying ribbon 1 from becoming embedded in the sausage meat 12. The ribbon 1, being a piece of animal membrane, readily adheres to the natural casing 8, and together with the use of the large stuffing horn prevents the identifying ribbon from being buried in the meat, and prevents air bubbles or "blisters" from forming between the identifying ribbon and the casing. The casing and the identifying ribbon being of identical translucency, the ribbon as a separate entity is not readily visible in the finished sausage. The fact that the ribbon and the casing have similar expansion characteristics including coefficients of expansion, prevents wrinkling during curing and smoking or drying. Also, the ribbon binds firmly to the casing and is removed from the sausage if the casing is peeled therefrom.

The use of ordinary papers, parchment, "Cellophane" and like materials, have proven unsatisfactory for use in preparing the identifying ribbon for the reasons mentioned heretofore. However, a paper manufactured from banana fiber such as *Musa textilis* as disclosed in the patent of Osborne entitled Porous long fibered nonhydrated paper, No. 2,045,096 issued June 23, 1936, makes an acceptable substitute for the casing strips above described, provided an extremely light weight, such as seven pounds per ream, or less, is used. This material binds to the natural casing, is not visible from outside the sausage, and in other respects makes an acceptable identifying ribbon for sausages encased in natural casings.

It is to be understood that the invention is not limited to the details above described, but may comprehend such other processes, arrangements of details or features as may be consistent with the claims and the prior art.

I claim:

1. The method of producing a marked, cured, stuffed sausage which comprises placing a strip or ribbon of animal membrane imprinted with identifying indicia on a nozzle of a sausage stuffing means, threading a natural casing over the nozzle and strip, stuffing the casing with meat and processing the stuffed sausage.

2. The method of producing a marked, cured, stuffed sausage which comprises placing a strip or ribbon of light weight long fibered paper prepared from banana fiber imprinted with identifying indicia on a nozzle of a sausage stuffing means, threading a natural casing over the nozzle and strip, stuffing the casing with meat and processing the stuffed sausage.

3. The method of producing a marked sausage encased in animal casings which comprises lightly moistening a branding strip or ribbon of animal membrane imprinted with identifying indicia, placing said moistened strip on a stuffing horn of a sausage stuffer, inserting an animal casing thereover, and stuffing said casing with sausage.

4. The method of producing a marked, cured sausage enclosed in a natural casing which comprises placing a lightly moistened strip or ribbon on the outer surface of a nozzle of a sausage stuffing means, the strip or ribbon being imprinted with identifying indicia and formed of material which will inherently readily adhere when moistened and bind to the natural casing and being constituted such that it becomes invisible as a separate strip or ribbon with respect to the natural casing when the sausage is cured, threading a natural casing over the nozzle and strip while maintaining substantially the entire internal surface of the casing directly exposed to the external surface of the nozzle except that portion of said internal surface in the zone where the strip is located, stuffing the casing with meat, and processing the stuffed sausage.

CHARLES T. WALTER.